United States Patent [19]
Bahner et al.

[11] Patent Number: 5,659,975
[45] Date of Patent: Aug. 26, 1997

[54] BOARD DRYING PROCESS AND DRIER

[75] Inventors: Friedrich Bahner, Rotenburg/Fulda; Manfred Braun, Bad Hersfeld; Karl-Friedrich Lang, Bad Hersfeld; Gerhard Lehn, Bad Hersfeld; Karl Maurer, Bad Hersfeld; Manfred Schmidt, Oberaula-Olberode; Josef Steinkuhl, Bad Hersfeld, all of Germany

[73] Assignee: Babcock BSH AG, Krefeld, Germany

[21] Appl. No.: 591,545

[22] PCT Filed: Jul. 27, 1994

[86] PCT No.: PCT/EP94/02479

§ 371 Date: Jan. 25, 1996

§ 102(e) Date: Jan. 25, 1996

[87] PCT Pub. No.: WO95/04908

PCT Pub. Date: Feb. 16, 1995

[30] Foreign Application Priority Data

Aug. 11, 1993 [DE] Germany .................. 43 26 877.3

[51] Int. Cl.[6] .................................................. F26B 7/00
[52] U.S. Cl. .................. 34/459; 34/489; 34/496; 34/500; 34/504; 34/619; 34/623; 34/636
[58] Field of Search .................... 34/421, 422, 423, 34/446, 448, 450, 451, 459, 488, 489, 496, 500, 504, 619, 620, 623, 636, 637, 649, 651

[56] References Cited

U.S. PATENT DOCUMENTS

| 1,399,276 | 12/1921 | Roberts | 34/205 |
| 2,266,489 | 12/1941 | Camp et al. | 34/451 |

(List continued on next page.)

FOREIGN PATENT DOCUMENTS

| 2 311 261 | 12/1976 | France . |
| 2 614 092 | 10/1988 | France . |
| 505017 | 7/1930 | Germany . |
| 26 13 512 | 10/1977 | Germany . |
| 29 41 037 | 4/1980 | Germany . |

OTHER PUBLICATIONS

"Planung, Bau und erste Betrieberfahrungen mit einer Produktionsanlage für Gip–Wandbauplatten" by Bloch et al., published in Zement–Kalk–Gips, No. 8/1991 (44th Year).

Trockungstechnik Third Volume K. Kröll "Drying and Driers in Production" by W. Kast, pp. 489–496.

Primary Examiner—John M. Sollecito
Assistant Examiner—Steve Gravini
Attorney, Agent, or Firm—Herbert Dubno

[57] ABSTRACT

In order to dry boards, the boards are guided on racks through a drier and brought into contact with drying air in two stages. In a stage A with a higher drying power, the drying air is supplied at a higher temperature and with an at least average humidity, and in the other stage B, it is supplied at an average temperature and with a low humidity. The waste heat of the outgoing air from stage A is used for preheating the drying air. This process should reduce the consumption of primary energy. For that purpose, a process is known that consists of also using the outgoing air condensation heat. This has the inconvenience, however, of requiring substantially more secondary energy, as important air mass flows are required to transfer heat because of the low condensation temperature. Primary energy should be reduced by using condensation heat without substantially increasing secondary energy requirements. According to the invention, the outgoing air from stage A is supplied to stage B through a heat exchanger arranged in the rack of the drier. The drying air of stage B is supplied in counter-current through the drier with a low humidity and temperature, so that the boards are dried in stage B both by condensation heat and by radiant heat. Thus only a reduced mass flow of drying air is required to transfer the condensation heat. The consumption of primary and secondary energy is low. This invention is suitable for drying boards as for buildings and gypsum plain boards or fibre boards.

12 Claims, 6 Drawing Sheets

U.S. PATENT DOCUMENTS

| | | | |
|---|---|---|---|
| 2,329,581 | 9/1943 | Bernstein | 34/86 |
| 2,590,849 | 4/1952 | Dungler | 34/448 |
| 3,374,106 | 3/1968 | Thygeson, Sr. | 34/651 X |
| 4,242,808 | 1/1981 | Luthi | 34/459 |
| 4,312,136 | 1/1982 | Bahner et al. | 34/500 |
| 4,697,354 | 10/1987 | Gottschalk | 34/451 X |
| 4,872,270 | 10/1989 | Fronheiser et al. | 34/451 X |
| 5,212,877 | 5/1993 | Onur et al. | 34/448 X |
| 5,244,518 | 9/1993 | Krayenhagen et al. | 34/459 X |

BOARD DRYING PROCESS AND DRIER

CROSS REFERENCE TO RELATED APPLICATION

This is a national phase of PCT/EP94/102479 filed Jul. 27, 1994 which is based upon German national application P43 26 877.3 of Aug. 11, 1993 under the International Convention.

In the drying of boards, particularly building boards, such as gypsum plaster boards or mineral-fiber boards, the boards transported through a drier are brought into contact with heated air.

The supply of drying air can be done through longitudinal ventilation, cross ventilation or cross ventilation with nozzles. In the case of longitudinal ventilation the drying air is supplied at one end of the drier, or, when the latter is subdivided into several zone at one end of a zone, and evacuated at the opposite end.

In the case of cross ventilation the air is supplied at several locations on the sides of the drier and evacuated at the opposite sides, whereby it is possible to achieve larger mass flows of drying air through the drier. The largest air mass flows can be guided in the case of cross ventilation via nozzles through the so-called nozzle drier.

In most cases, an air recirculation process is used, wherein a large part of the drying air is recirculated. This drying air, also called recirculated air, is heated outside the inner drier space. Only a small part of the drying air is discharged as outgoing air and a part corresponding to the outgoing air is supplied from outside as fresh air.

For warming the drying air, e.g. through burners, optionally through damper registers, fuel i.e. primary energy is needed, and for the supply of air by fans electric energy, i.e. secondary energy is needed. The primary energy as well as the secondary energy, estimated to be three times as costly, should be kept as low as possible.

In the DE-Z Zement-Kalk-Gips, No. 8 1991, Pages 421 to 425 a process for the drying gypsum wall-building boards with cross ventilation is described, wherein a lower consumption of primary energy is achieved by using the condensation heat of the outgoing air. For this purpose in each of the two drier zones the hot air is cooled down in a heat exchanger arranged between the drier pipes for preheating of the hot air. Since the hot air, i.e. the drying air supplied to the board, is heated only to low temperatures, a large mass flow of drying air is needed. This leads to a relatively high consumption of secondary energy.

A further drying process wherein a low consumption of primary energy is achieved by using the condensation heat of the outgoing air is known from DE-A 26 13 512. This process is a two-stage process. In the first drying stage high temperatures and high air humidity are used and in the second drying stage low temperatures and low humidity are used. The drying efficiency of the first stage is two or three times greater than that of the second stage and the second drying stage is heated by the outgoing air of the first drying stage, due to the interposition of a heat exchanger. In both stages the drying air is supplied in a recirculation process, namely in the first drying stage in the form of a longitudinal ventilation and in the second stage in the form of cross ventilation with a large mass flow of recirculated air. The large recirculated air mass flow of the second stage and the resulting high consumption of secondary energy are the reasons why in practice this process has been replaced by the process of the invention.

In the generic drying process known from the book "Trocknungstechnik" by K. Kröll and W. Kast, Third Volume, 1989, Pages 489 to 493, gypsum plaster boards which are guided through the drier on decks, are also dried in two stages at high temperature but at average humidity of the drying air in the first stage and with average temperature and low humidity of the drying air in the second stage. In the generic drier two zones are provided for performing the first stage and one zone is provided for performing the second stage. This and the higher temperatures of the drying air in the first stage lead to the assumption of a higher drying efficiency in the first stage. Due to the higher temperature of the drying air in the second stage when compared to DE-A 26 13 512, extremely large mass flows of recirculated air are avoided, so that this process leads to a low consumption of secondary energy. However the consumption of primary energy is relatively high.

In attempting to reduce the consumption of primary energy by using the condensation heat of the outgoing air, a general problem arises due to the fact that the waste heat of the outgoing air is available only at a low temperature level. Although a lower temperature of the drying air could be compensated by larger air mass flows, this would lead to a higher consumption of secondary energy, as described in the known process.

OBJECT OF THE INVENTION

It is therefore the object of the invention to provide an improved process and drier for the drying of plasterboard and the like with the lowest possible consumption of primary and secondary energy. Specifically with the invention the used primary energy should be kept as low as possible by using the waste heat and also the condensation heat of the outgoing air, without increasing the requirement for secondary energy due to the recirculation of large air mass flows.

SUMMARY OF THE INVENTION

The process for drying boards which are guided through a drier on decks, according to the invention, contacts the boards with drying air in two stages A and B, whereby in stage A the drying is carried out in a recirculated-air process with high temperature and at least average air humidity and with a drying capability which is two to four times higher than in stage B, and in stage B the outgoing air of stage A can be guided through a heat exchanger arranged in the decks of the drier and the drying air at a low temperature and low humidity can be guided in counterflow to the outgoing air of stage A.

In stage A, drying air at a temperature of 150° to 300° C. and an air humidity of 0.2 to 0.8 can be supplied, drying air at a temperature of 120° to 200° C. and an air humidity of 0.2 to 0.8 is discharged, and a part thereof is directed into stage B, and in stage B drying air is supplied in the form of longitudinal ventilation, whereby the drying air with a temperature of 20° to 80° C. and an air humidity of 0.005 to 0.015 is supplied and drying air at a temperature of 80° to 110° C. and an air humidity of 0.03 to 0.1 is discharged.

The outgoing air leaving the heat exchanger in stage A can be directed into a heat exchanger for preheating the drying air of stage B.

The drying air of stage A, guided as recirculated air, can be heated by at least one burner, the drying air discharged from stage B being directed towards the burners. Advantageously the boards are at first dried in a preliminary drying stage, are subsequently dried in stage A and are finally dried in stage B.

Alternatively the boards are dried at first in stage B and subsequently in stage A.

A drier for drying boards, with a conveying device for transporting boards arranged on decks through the drier, can have a section A with at least one zone, which has a supply device, an evacuation device and a recirculated-air channel with conveying means and a heating device for recirculated air, as well as means for the supply of incoming air and means for the discharge of outgoing air, and a section B with a supply device for drying air and an evacuation device for drying air which are arranged at opposite ends of the drier.

A heat exchanger can extend in the decks above the conveying device through the section B of the drier, and can have a supply device and an evacuation device which are arranged at opposite ends of the drier, whereby the supply device of the heat exchanger is connected with at least one means for discharging the outgoing air of section A. The supply device of the heat exchanger and the supply device for the drying air of stage B can be arranged at opposite ends of the drier.

The drier can have a heat exchanger for preheating the drying air of section B, whose supply line is connected to the evacuation device of the first-mentioned heat exchanger. The heating installation of section A can consist of burners and the evacuation device for drying air of section B can be connected with the incoming air lines of a burner.

The conveying device can have roller conveyors or belt conveyors. The first-mentioned heat exchanger can have tubes running parallel to the travel direction. The tubes can be interrupted by collectors arranged transversely to the travel direction and to which they are connected.

In stage B the outgoing air of stage A with a high water vapor content, guided through the heat exchanger, is cooled down by the drying air with a lower temperature to the point that a part of the water vapor condensates.

The waste heat and condensation heat of the outgoing air of stage A reach the inside of the drier in the immediate environment of the boards to be dried and are transmitted to the boards in the form of radiation and convection heat. Heating devices arranged outside the drier are not required. Pipes for the recirculated air can be simplified or saved.

By using also the condensation heat, which is made possible by the low temperature of the drying air cooling the heat exchanger and the at least average air humidity of the outgoing air of stage A, the primary energy is intensively utilized.

Due to the fact that the drying air is guided in counterflow to the outgoing air of stage A guided through the heat exchanger, cooler drying air meets already cooled outgoing air. This insures the widest possible condensation of the water vapors contained in the outgoing air and improves the utilization of primary energy. The intensive utilization of the primary energy leads to considerable savings of primary energy.

Generally in stage B the drying is done at the most with one half of the drying power of stage A. Thereby a part of the heat is transferred to the boards through heat radiation, due to the arrangement of the heat exchanger in the decks of the drier. Therefore for the transfer of the second part of the heat through convection only a relatively small amount of drying heat is required. The secondary energy required for guiding this relatively low amount of drying heat is considerably lower in the process of the invention than the one needed in processes with similar low consumption of primary energy.

Therefore in the process of the invention the primary energy is utilized to the largest possible extent, without substantially increasing the need for secondary energy.

In stage A the drying can take place according to the recirculated-air process, whereby drying air with a temperature of 150° to 300° C. and an air humidity of 0.2 to 0.8 is supplied and drying air with a temperature of 120° to 200° C. and an air humidity of 0.2 to 0.8 is discharged. A part of this drying air is drawn from stage A as outgoing air and guided into the heat exchanger of stage B. In stage B the drying air is supplied through longitudinal ventilation, whereby drying air with a temperature of 20° to 80° C. and an air humidity of 0.005 to 0.015 is supplied and drying air at a temperature of 80° to 110° C. and an air humidity of 0.03 to 0.1 is discharged.

With the drying power of stage A which is two to four times higher and the foregoing process parameters, the primary energy is optimally used with the lowest possible consumption of secondary energy.

In comparison to the prior art process, the process of the invention can dispense with the burner used in the third zone of the prior art process.

The mass flow needed in the process of the invention is even smaller than in the stage B, i.e. in the third zone of the prior art process. The process parameters make possible such a reduced mass flow of the drying air in stage B, that the drying air can be supplied in the form of a simple longitudinal ventilation, i.e. the recirculation of the drying air and therefore the recirculated-air pipes can be fully dispensed with. The total amount of secondary energy needed in the process of the invention, taking into consideration the additionally required electric energy for guiding the outgoing air of stage A through the heat exchanger of stage B, is approximately as great as in the prior art process.

Since due to the heat exchanger surfaces the flow cross section in the inner space of the drier is also reduced, the smaller mass flow of drying air can be guided past the boards at a flow velocity which is almost equal to stage A.

The invention can utilize a preheating of the drying air supplied to stage B in a second heat exchanger outside the-drier, through which the outgoing air leaving the stage B is guided.

The heat contained in the drying air discharged from stage B is used by directing the drying air to the burners of stage A.

The process is particularly suited for drying gypsum plaster boards, which towards the end of the process are not supposed to be exposed to very high temperatures, because of the danger of gypsum calcination. Therefore after a preliminary drying, the boards are dried at first at high temperatures in the stage A and subsequently at lower temperatures in stage B. Besides this temperature course favors the starch migration which is needed for good cardboard bonding.

The alternative approach is particularly suited for drying boards, e.g. mineral-fiber boards, which could also be exposed in a dry state to higher temperatures. In this process the boards are predried in stage B and in stage A are dried to ultimate humidity. In this temperature course the drying takes place at high temperature differences of drying air and boards, which leads to a particularly efficient utilization of primary energy.

A roller-conveyor drier or a belt drier according to the invention can have several roller conveyors or belts arranged on top of each other, is particularly well suited for incorporating a heat exchanger which thereby extends in the decks above roller conveyors or belts.

The heat exchanger can have heat exchanger tubes running parallel to the conveying device or can have heat exchanger plates. The advantage of the tubes is a lesser danger of contamination of the heat exchanger, while the plates are easier to mount.

When the heat exchanger is equipped with tubes, these are advantageously interrupted by collectors arranged transversely to the conveying direction, whereby the tubes are connected to these collectors. In the collectors the condensate can be collected and discharged from there. In certain cases the collectors also facilitate the cleaning of the tubes, since through them cleaning devices can be introduced into the tubes.

BRIEF DESCRIPTION OF THE DRAWING

The above and other objects, features, and advantages will become more readily apparent from the following description, reference being made to the accompanying drawing in which.

The invention is further explained with the aid of an example schematically represented in the drawing.

SPECIFIC DESCRIPTION

A drier is provided with a conveying device for the transport of boards arranged on decks through the drier. The drier can be built as a roller-conveyor drier or a belt drier, whereby the conveying device has several roller conveyors or conveyor belts arranged one on top of another.

In the following with the aid of the process flow diagram in FIG. 1A first a prior art drier and subsequently a drier according to the invention for drying gypsum plaster boards is described.

Figure 1A:
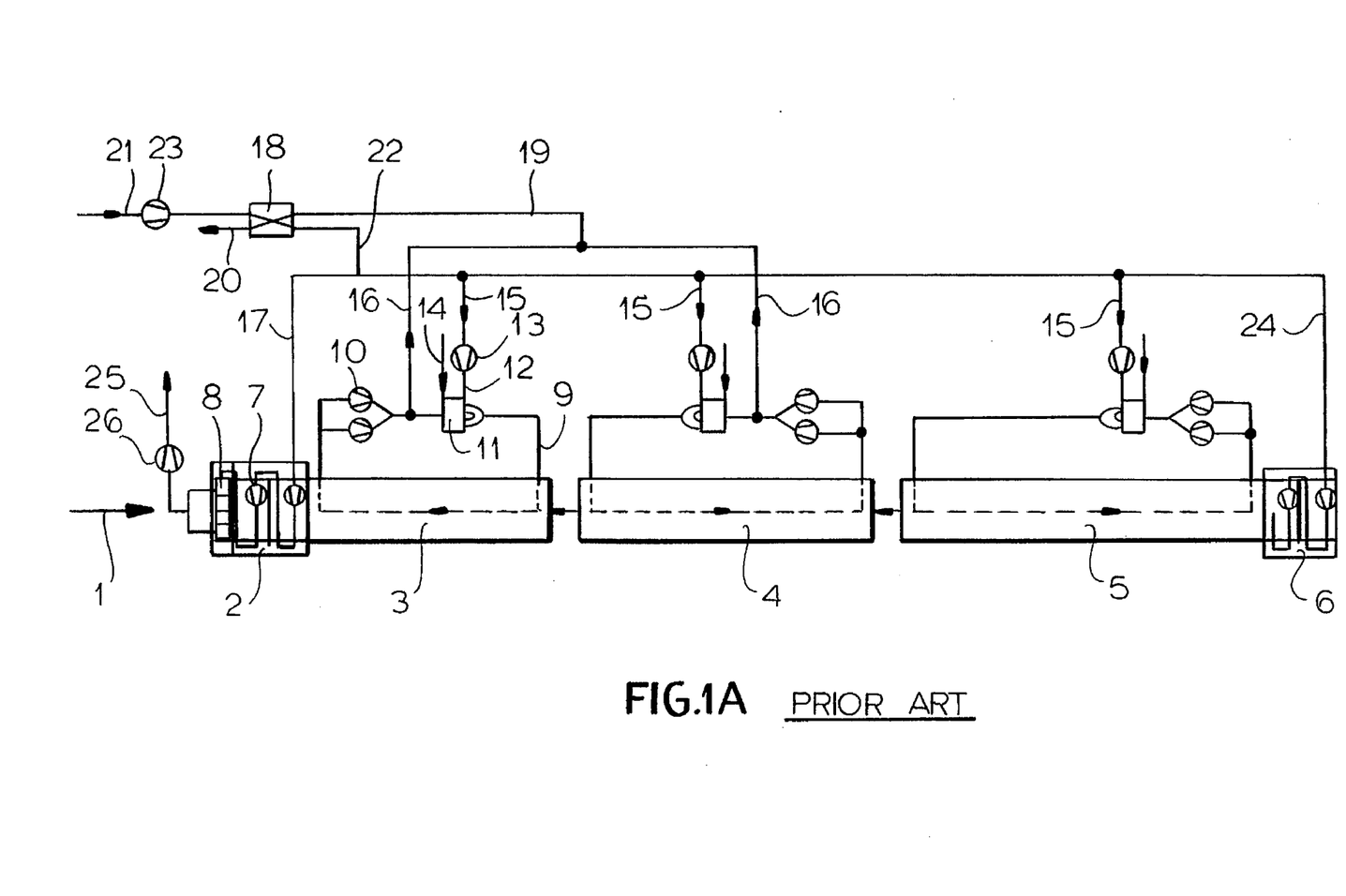
FIG. 1A is a process flow diagram of the invention.
Figure 1B:
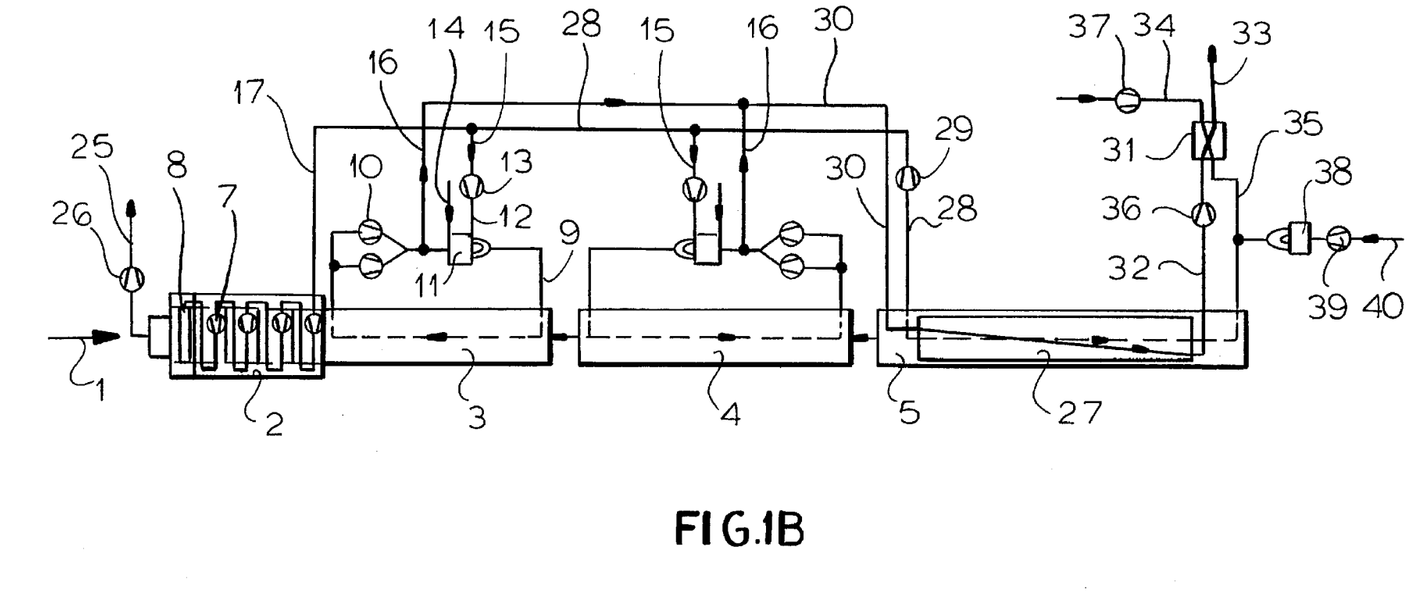
FIG. 1B is a process flow diagram of the prior art (top).

The prior art drier shown in FIG. 1B is subdivided in the travel direction of the boards into a preliminary drying section 2 with two nozzle areas, a section A with two zones 3, 4, longitudinally ventilated according to the air recirculation process, a section B with a zone 5 longitudinally ventilated according to the air recirculation process and a supplementary drying section 6 with two nozzle areas.

In each of the nozzle areas of the preliminary and supplementary drying sections 2, 6, the drier has a cross ventilation with nozzles and a fan 7. In the introductory part of the preliminary drying section there is also a suction device 8 for drying air.

In each of the zones 3, 4, 5 of sections A and B the drier has a supply device, an evacuation device and a recirculation channel 9 with conveying means and a heating device for the recirculated air.

The supply and evacuation devices are arranged respectively at opposite ends of a zone 2, 3, 4, whereby in the travel direction 1 of the boards the supply device of the first zone 3 is arranged at the end of zone 3 and the supply devices of the second and third zone 4, 5 are arranged at the beginning of each of the zones 4, 5.

In the respective recirculated air channel 9, which connects the evacuation device with the supply device of a zone 3, 4, 5 the conveying means and the heating device are arranged one after the other, starting from the evacuation device. In each zone two fans 10 connected in parallel are provided as conveying means for the recirculated air. Each of the heating devices has a burner 11 for oil or gas, an air connection 12 with a fan 13 and a fresh air connection 14. Instead of direct heating it is also possible to provide indirect heating, whereby the heating device can have damper registers, e.g. with thermal oil.

Air supply lines 15 for the air supply of zones 3, 4, 5 are connected to the fans 13 for the burners 11. Air outlet lines 16 for the outgoing air of the first and second zones 3, 4 branch out respectively between the fans 10 and the burners 11 of the recirculated air channels 9.

An air supply line 17 is connected to the fan 7 of the second, i.e. last nozzle area of the preliminary drying section 2.

The drier has also a heat exchanger 18 arranged outside the inner drier space, with supply and outlet lines 19, 20 for outgoing air and supply and outlet lines 21, 22 for fresh air.

The outgoing-air lines 16 of the two zones 3, 4 are connected to the supply line 19 for outgoing air. The outgoing line 20 for outgoing air ends in a chimney not shown in the drawing.

In the supply line 21 for fresh air a fan 23 is arranged. The outlet line 22 for fresh air branches out into the incoming air lines 17, 15 of the preliminary drying section 2 and of the three zones 3, 4, 5 and in an incoming air line 24 which leads to the fan 7 of the second, i.e. last nozzle area of the supplementary drying section 6.

An outgoing air line 25 with a fan 26 leads outward from the preliminary drying section 2.

The zones 3, 4, of section A and the zone 5 of section B of the drier are connected to each other so that an air exchange is possible between them.

The drier of the invention illustrated in diagram of FIG. 1A is subdivided into a preliminary drying section 2 a section A with two zones 3, 4 and a section B with one zone 5.

In contrast to the prior art drier, its preliminary drying section 2 has four nozzle areas. A supplementary drying section is not provided.

The construction of the preliminary drying section 2 and of the section A with the two zones 3, 4 correspond with the generic drier.

However in section B, i.e. in zone 5, the drier has only one supply device and one evacuation device for drying air, i.e. it has no recirculated air channel, and one heat exchanger 27 with a supply device and an evacuation device.

The supply and evacuation devices of the heat exchanger 27 and for the drying air are respectively arranged at opposite ends of zone 5, whereby the supply device of the heat exchanger 27 and the evacuation device for drying air at the beginning of zone 5 are arranged in the travel direction 1 of the boards.

The evacuation device for drying air is connected with an air line 28, wherein a fan 29 is arranged, and which branches out into the incoming air lines 15 for the incoming air of zones 3, 4 of section A and the incoming air line 17 of the preliminary drying section 2.

In the supply device of the heat exchanger 27 ends an air line 30 for the outgoing air of section A, to which the outgoing air lines 16 of the first and second zone 3, 4 of section A are connected.

In addition the drier has a heat exchanger 31 for preliminary heating of the fresh air, i.e. the drying air supplied to section B, with incoming and outgoing lines 32, 33 for the outgoing air and with incoming and outgoing lines 34, 35 for fresh air.

The supply line 32 for outgoing air is connected to the evacuation device of the heat exchanger 27 and is provided with a fan 36. The outlet line 33 for outgoing air ends in a chimney which is not shown in the drawing.

In the supply line 34 for fresh air a fan 37 is arranged. The outlet line 35 for fresh air leads to the supply device for the drying air of section B. In the outlet line 35 ends a line 40 provided with a burner 38 and a fan 39, for preheating the fresh air at the start of the drier and for regulating the temperature of the fresh air.

Figure 2:
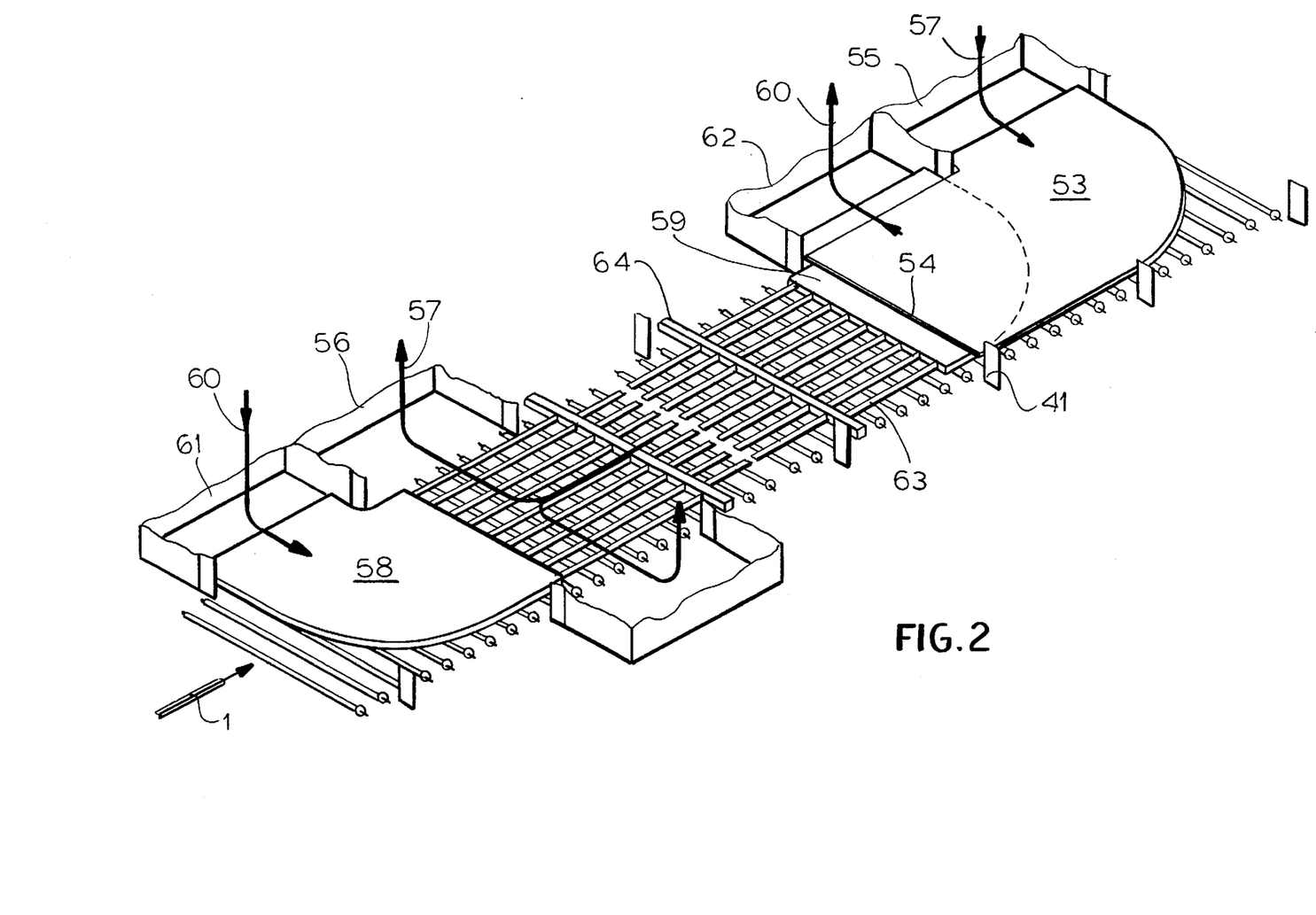
FIG. 2 shows a deck of section B of the drier according to the invention in a perspective view.
Figure 3:
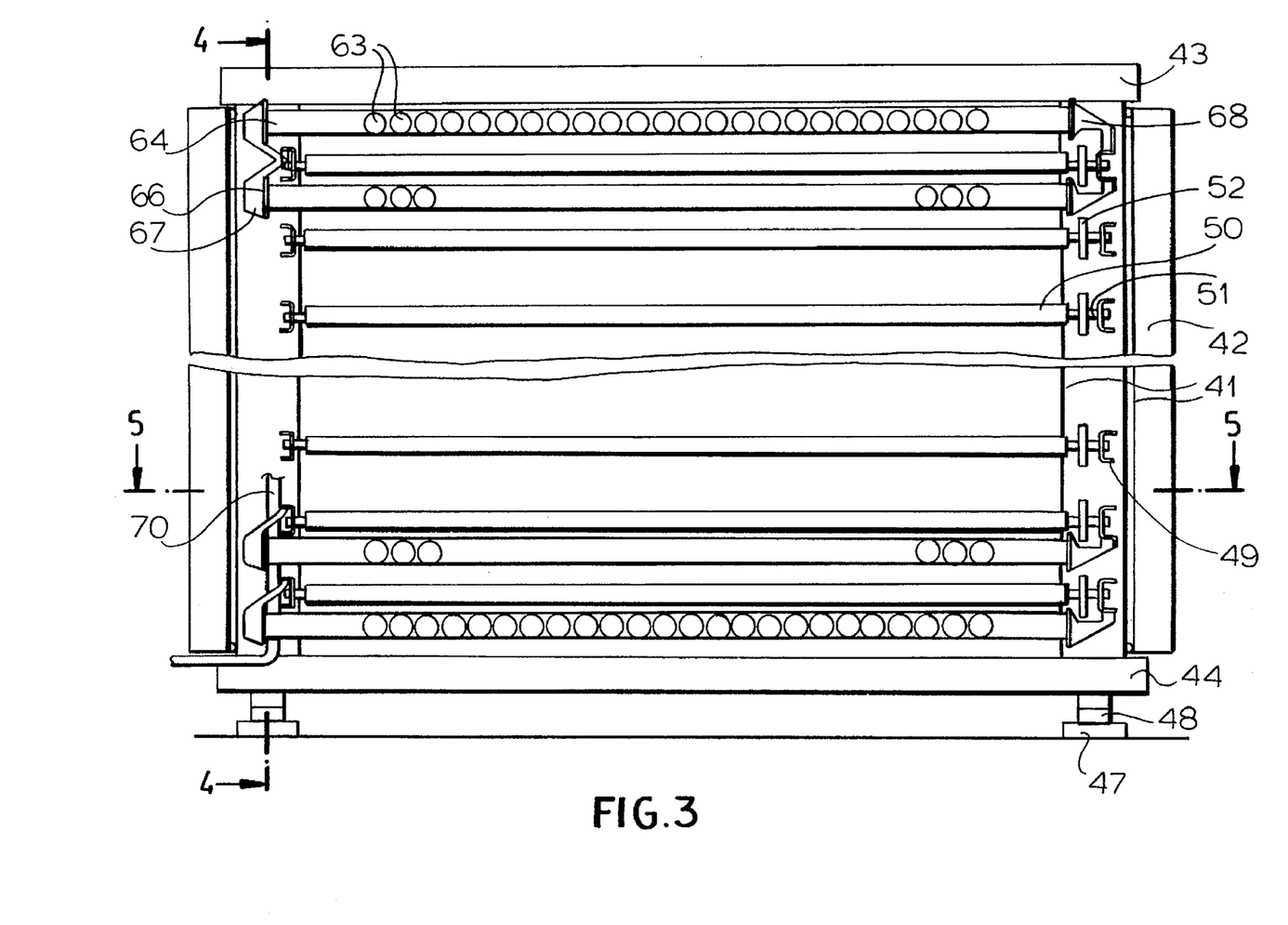
FIG. 3 is a cross section through the drier in section B.
Figure 4:
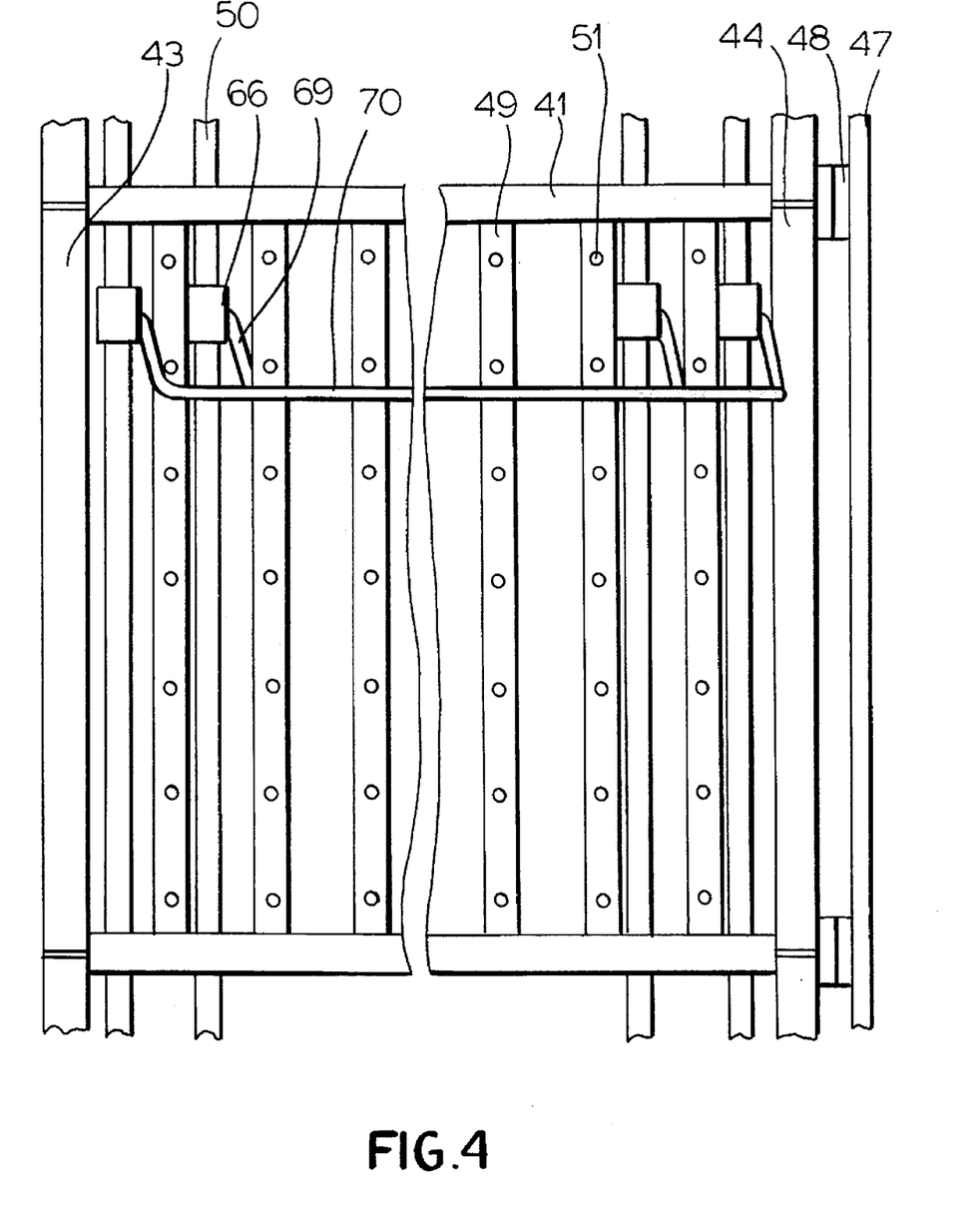
FIG. 4 is a side view of a segment along lines 4—4 in FIG. 5.
Figure 5:
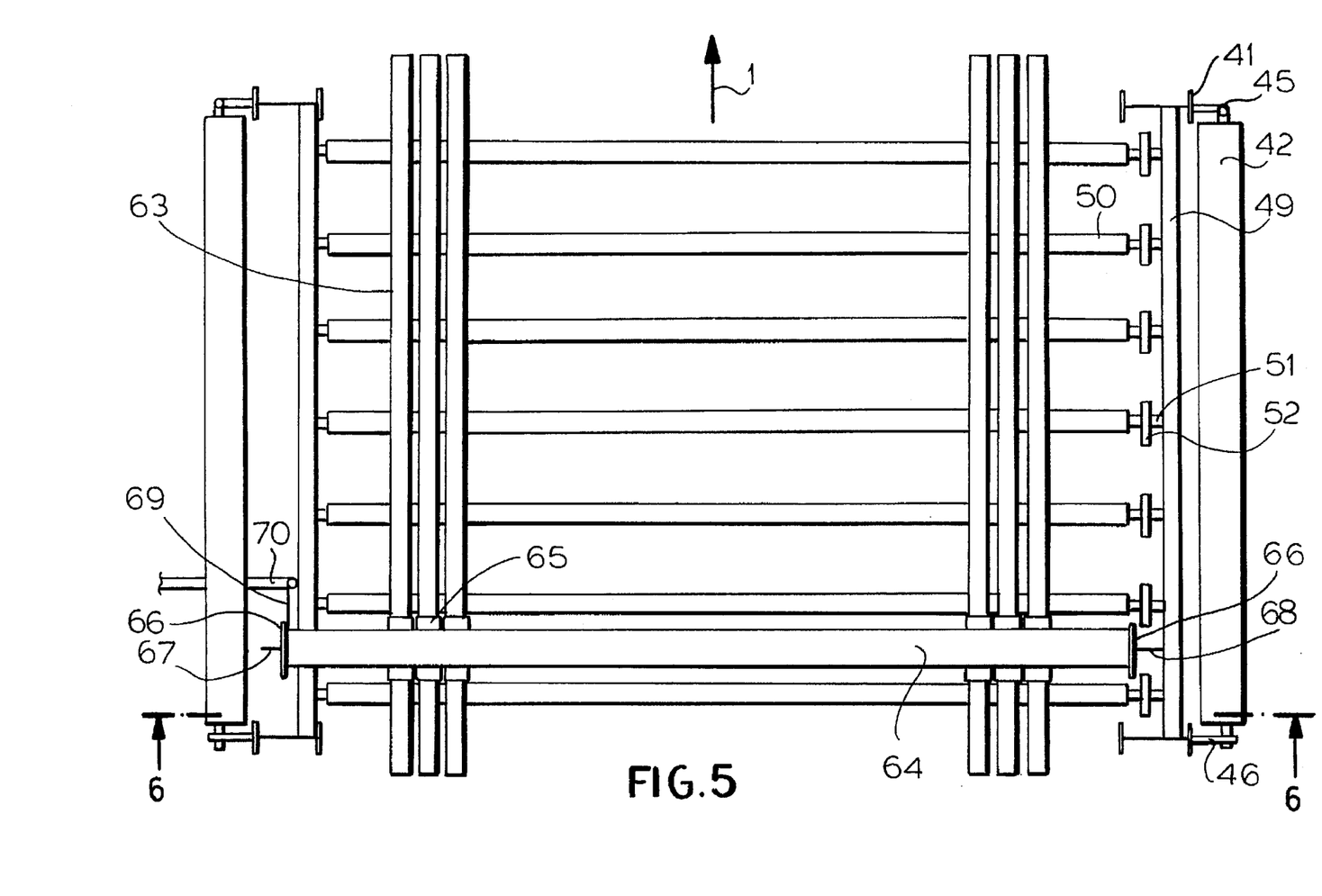
FIG. 5 is a vertical cross section through a segment of the drier in section B along lines 6,6.

The zones 3, 4, 5 of the drier are subdivided into fields by vertical supports 41 arranged on both sides (see FIG. 2). The supports 41 consist for instance of double T-sections (FIGS. 3, 4, 5).

Each field has two side walls 42, a ceiling 43 and a bottom 44. The side walls 42, the ceiling 43 and the floor 44 are built as double walls and provided with insulating material. They are fastened to the supports 41, whereby the side walls 42 are fastened for instance via hinges 45 to the rear supports 41 and via closures 46 to the front supports 41.

Underneath the supports 41 on the bottoms 44 legs 48 are mounted, which are provided with rollers and guided in a support rail 47. On each side of the drier, between every two supports 41, roller supports 49 arranged on top of each other and fastened to the supports 41 extend horizontally. The roller supports 49 consist for instance of U-shaped sections, whose bottoms are arranged vertically and whose arms are pointing outward. Between two roller supports 49 located on both sides at the same level, horizontal, cylinder-like rollers 50 of a roller conveyor, arranged in succession, extend transversely to the travel direction 1. Each of the roller conveyors arranged on top of each other form the bottom of a rack wherein the boards are transported.

The rollers 50 are provided at their ends with pivots 51, by means of which they are supported in the roller supports 49. On one side (in the example on the right side seen in the travel direction 1) sprockets 52 are located on the pivots 51 in front of the roller supports 49. A driven chain (not shown in the drawing) is guided over these sprockets 52. A chain can extend for instance over the entire conveying length of the drier and can drive the rollers of two superpositioned decks, in that in the lower deck it is guided above the rollers 50 over the chain wheels 52 and in the rack located thereabove it is guided underneath the rollers 50 over the chain wheels 52.

In the first and last fields of zones 3, 4 of section A there are also the supply device and the evacuation device for the recirculated air, whereby the supply device is located in the last field of the first zone and in the first field of the second zone 4 and the evacuation device is correspondingly located in the first field of the first zone 3 and in the last field of the second zone 4.

FIG. 2 shows the layout of the supply and evacuation devices for drying air, as well as the arrangement of the heat exchanger 27 in a deck.

In the section B in zone 5 the supply device for drying air extends over the last two fields. The evacuation device for drying air is arranged in the second field. The supply device for the heat exchanger 27 is located in the first field and its evacuation device is located in the second last field of zone 5.

In each rack the supply device for drying air has in the upper deck area a plate-like nozzle 53, extending over two fields and over the entire width of the roller conveyor, which has a lateral opening (not visible) for the incoming drying air and an opening 54 pointing into the deck against the travel direction 1 for the exiting drying air. The nozzles 53 are provided with baffle plates on the inside.

The supply device for drying air has on each side of the drier an incoming air channel 55 extending over the length of the last field and the entire height of the drier and wherein end the lateral openings of the nozzles 53. In the second field of the section B, the evacuation device has a corresponding outgoing air channel 56. The flow direction of the drying air is indicated by arrows 57.

The supply and evacuation devices of the heat exchanger 27 have respectively in each deck plate-like nozzle 57 [sic] and 58, arranged above the roller conveyor. The nozzles 58 and 59 are also provided with baffle plates on the inside. Each nozzle 58 has a lateral opening for the entering outgoing air and each nozzle 59 has a lateral opening for the exit of the outgoing air. The flow direction of the outgoing air is indicated by arrows 60. Each of the lateral openings of the nozzles 58, 59 also ends in a channel 61, 62, which extends over the entire length of the corresponding field and over the entire height of the drier.

In each rack the nozzle 59 of the evacuation device of heat exchanger 27 is arranged underneath the nozzle 53 of the supply device for drying air and projects somewhat under the nozzle 53. The nozzle 58 of the supply device is arranged at the same level as the nozzle 59 of the evacuation device. In addition the heat exchanger 27 has tubes 63 and collectors 64 arranged at the same level.

The arrangements of the heat exchanger 27, consisting of a nozzle 58, tubes 63, collectors 64 and a nozzle 59 in the decks extend approximately over the entire length of the roller conveyor (whereby in FIG. 2 only every third roller 63 is indicated). Such an arrangement is also located underneath the lowest deck. In FIGS. 3 to 5, which show the inner drier space in section B, the heat exchanger 27 is shown only in two uppermost decks, in the lowest deck and underneath the lowest deck. Thereby in the second uppermost rack and in the lowest rack only a few tubes 63 are shown.

The tubes 63 extend parallelly to the travel direction 1 from the nozzle 58 of the supply device to the nozzle 59 of the evacuation device, to which they are respectively connected. The tubes 63 are interrupted by the collectors 64 arranged transversely to the travel direction 1, to which they are connected by detachable connection elements 65 (shown only in FIG. 5).

The nozzles 58 and 59 are closed towards the inner space of the drier, with the exception of openings for the tubes 63. For the uniformization of the radiation onto the plates, the tubes 63 can be staggered transversely to the travel direction 1 by half the distance between tubes. They can have a smooth surface and can be made of stainless steel, aluminum, galvanized or flame-aluminized sheet metal.

The collectors 64 can also be made of the same materials. They are for instance arranged at equal intervals, whereby a collector 64 is located in each field. However the distance between the collectors 64 can also be different, according to the degree of contamination of the tubes for instance, and can amount up to two to four field lengths. In these cases the tubes 63 between collectors 64, e.g. in the fields without collectors, are held by supports (not shown in the drawing).

The for instance box-shaped collectors 64 with rectangular cross section and rounded edges are provided with two lateral covers 66 which can be unscrewed. They are fastened to the roller supports 49 via mountings 67, 68 fastened to the covers 66. The mountings 67, 68 consist for instance of metal sheet plates widening towards the covers 66. They can also consist of sections.

Via discharge lines 69 connected to the bottom of collectors 64, the collectors 64 are connected to a vertical drainage pipe 70. The drainage pipes 70 abut for instance via a siphon in a drainage channel or via a drainage channel in a water recipient with a water column of for instance 30 mm. In FIG. 3 the drainage pipe 70 is shown only in the lower decks.

The cross section of the tubes 63 is round. It can also be oval or elliptic, in order to increase the horizontal radiation surface.

Instead of tubes 63 the heat exchanger 27 can also have plates connected to the nozzles 58, 59, which are for instance arranged one on the other and supported fieldwise and are provided with cleaning devices.

The width of a roller conveyor is of about 3 to 4 meters, the length of a field for instance 2.40 m. In each field there are five to seven rollers 50 arranged one after the other. The length of each of the zones 3, 4 of section A equals 20 m, the length of zone 5 of section B 50 to 70 m. The drier has 12 decks. The number of decks can vary between 8 and 14.

According to the invention during operation the boards are continuously moved on decks through the drier, by means of the driven rollers 50 of the roller conveyors. Depending on the size of the inner drier space and the width of the boards, two to four boards are arranged next to each other. Thereby the boards are successively brought into contact with the drying air in a stage A and a stage B. In this example for drying the gypsum plaster boards they are first dried in a preliminary drying stage.

Before drying the humidity of the boards amount to 45% (kg water per kg dry substance in %) and their temperature is 40° C. through the already initiated setting of the gypsum.

In the preliminary drying stage the boards run through four nozzle areas of the preliminary drying section 2. The supply of drying air takes place in cross countercurrent with respect to the travel direction 1, namely in the form of cross ventilations with nozzles arranged one after the other, whereby the drying air is supplied to the last nozzle area and is discharged by the exhaust 8 at the beginning of the first nozzle area. The drying air discharged from the zone 5 of section B and directed to the preliminary drying section 2 has an air humidity of 0.04 to 0.05 (kg water per kg dry air) and a temperature of 100° C. After running through the preliminary drying section 2, the humidity of the boards amounts to 42% and their temperature to 60° to 70° C.

In stage A the boards run through the first and second zone 3, 4 of section A and are thereby brought into contact with drying air at a flow velocity of approximately 7 to 15 m/s. In each of the two zones 3, 4 the supply of drying air takes place in the form of a longitudinal ventilation according to the recirculated-air process, whereby the drying air is supplied from the recirculated-air channels 9 through the supply devices of zones 3, 4 and after passing through the zones 3, 4 it is discharged through the evacuation device into the recirculated-air channels 9, where it is reheated. The supplied drying air has an average humidity of 0.3 to 0.5 and a high temperature of about 260° to 280° C. The discharged drying air has a slightly higher humidity also of 0.3 to 0.5 and a temperature of for instance 170° C.

In the first zone 3 of section A the drying air is supplied in countercurrent with respect to the travel direction 1 of the boards and in the second zone 4 it is guided in the same direction as the travel direction 1. The drying air supplied to the second zone 4 can have a slightly higher temperature and a slightly lower humidity than the drying air supplied to the first stage. Besides with the aid of fans 10, 13 of stage A and the fans 29, 36 of stage B the pressure conditions in the air systems are set so that a certain amount of drying air from zone 5 of section B flows into the zone 4 of section A, and from the zone 4 of section A into the zone 3 of section A.

In section A the boards are dried to a humidity of 10 to 12%. The temperature continues to be approximately 100° C.

In stage B the boards run through the zone 5 of section B. The supply of drying air takes place in the form of a longitudinal ventilation in countercurrent to the travel direction 1 of the boards. Besides in stage B the outgoing air of stage A is guided through the heat exchanger 27 arranged in the decks of zone 5 in the same flow direction as the travel direction 1. This way the drying air of stage B and the outgoing air of stage A are guided in countercurrent to each other.

The outgoing air of stage A is aspirated from the recirculated-air channel 9 of zones 3, 4 between the fans 10 and the burners 11 and directed through the lines 16 and 30 to the supply device of the heat exchanger 27. It is fed via nozzles 58 into the tubes 63, traverses the tubes 63 and the collectors 64 and is discharged via the nozzles 59 of the evacuation device of heat exchanger 27. Thereby a part of the water vapor contained in the outgoing air condensates. The condensate is collected in collectors 64 and directed via the drainage lines 69 to the drainage pipe 70 and the drainage channel.

From the discharge device of the heat exchanger 27 the outgoing air is guided via the discharge line 35 through the heat exchanger 31 to the chimney. In the heat exchanger 31 fresh air aspirated from the outside by the fan 37 is heated and supplied to the via the discharge line 35 to the supply device for drying air.

When the drier is started, optionally fresh air aspirated by the fan 39 is heated in burner 38 and directed via the discharge line 35 to the supply device for drying air. The burner 38 can also be used for regulating the temperature of the drying air fed to the supply device.

The drying air supplied through the nozzles 53 of the supply device has a humidity corresponding to the normal humidity of the ambient air of 0.005 to 0.015 and a temperature of e.g. 60° C. While passing through the zone 5 of section B the humidity of the drying air increases to 0.04 to 0.05 and its temperature increases to about 100° C. This drying air is discharged through the discharge channel 55 of the evacuation device and supplied to the burners 11 of the zones 3, 4 of section A via the air lines 28 and the incoming air lines 15 to the burners 11 of zones 3, 4, and over the air line 28 and the incoming air line 17 to the preliminary drying section 2, as already mentioned.

In stage B, for drying the boards the heat is transferred to the boards through convection, as well as through radiation.

In the heat transfer through convection the boards are brought into contact with the drying air which was preheated in the heat exchanger 31 and which is heated inside the drier through contact with the heat exchanger surfaces of the heat exchanger 27. Through a reduced mass flow of the drying air at a reduced flow cross section, the flow velocity is also set at 7 to 15 m/s. Due to the low temperature level there is no danger of the boards being overdried by heat radiation.

The heat transfer through radiation takes place over the heat exchanger surfaces of the heat exchanger 27 arranged in the decks of the drier, i.e. through nozzles 57 of the supply device, the tubes 60, the collectors 61 and the nozzles 58 of the discharge device.

The heat amounts transferred to the boards by convection and radiation are approximately equal. Thereby the boards are dried to a humidity of ≦0.3%. When they leave section B their temperature is 60° C., so that cooling or compartimentalization are no longer needed.

We claim:

1. A recirculated-air process for drying boards comprising the steps of:
    (a) advancing a plurality of heated wet boards in succession along a board path in a travel direction through at least one first heating section and a drying section;
    (b) passing an incoming drying air having a first relatively low temperature and first air humidity along an air path in counterflow to the travel direction after passing through a first heat exchanger provided in decks of the drying section;
    (c) branching a portion of the drying air from said first heat exchanger into the heating section for encountering and heating the boards releasing a humidity, so that the drying air in said heating section has a humidity above that of the incoming air;
    (d) thereafter evacuating the drying air from the heating section and conveying evacuated air in the travel direction toward the drying section, said evacuated air having a second temperature and second humidity higher than said first temperature and humidity of said incoming drying air;
    (e) passing the evacuated air in the travel direction through the first heat exchanger in the drying section; and
    (f) feeding a fresh drying air having a third temperature and humidity less than said first air temperature and humidity of said incoming drying air through said first heat exchanger in the counterflow, so that the fresh air substantially reaches the first temperature and the first humidity of step (b) upon heat exchanging with the evacuated air in said first heat exchanger.

2. The process defined in claim 1 wherein
said process further comprising the steps of:
discharging said evacuated air at the temperature from 80° to 110° C. and humidity from 0.03 to 0.1 downstream from said exchanger along said board path, and
discharging said incoming air at the first temperature from 150° to 300° C. and first humidity from 0.2 to 0.8 at a location upstream from said heating section along said board path, said portion of the drying being evacuated in step (d) at the second temperature from 120° to 200° C. and second humidity from 0.2 to 0.8 before entering said heat exchanger in step (e).

3. The process defined in claim 2 wherein part of the portion of the evacuated air discharged upon leaving the heat exchanger is directed to another heat exchanger downstream of said first heat exchanger in said drying section for heating said fresh air before the latter enters said first heat exchanger in step (e).

4. The process defined in claim 1 wherein said step (c) further comprising a step of additional heating of the potion by a burner located along said path in said heating section.

5. The process defined in claim 1 wherein said step (a) including a step of preliminary heating where said plurality of boards is initially heated and dried.

6. A drier comprising:
    conveying means for advancing a plurality of wet and heated boards along a board path through at least one heating station and a drying station in one direction, said heating station being located upstream from said drying station;
    pump means for passing a fresh drying air having a first relatively low temperature and first air humidity in a second direction opposite said travel direction and located downstream from said drying station, said fresh drying air becoming an incoming drying air having a second temperature and humidity upon leaving an elongated heat exchanger located in said drying station;
    said heating station including:
        first supply means for branching said incoming drying air into the first station for encountering said plurality of boards,
        first evacuating means for pumping said drying air out of the heating station and conveying evacuated air in the second direction towards said drying section, said evacuated air having a third temperature and second humidity higher than said first and second temperatures and humidity of said fresh drying air and said incoming drying air;
    said drying station being provided with second evacuating means spaced upstream from said heat exchanger and being in flow communication with said first supply means for evacuating the fresh drying air from said heat exchanger and for passing the incoming drying air along said second direction, said fresh drying air being in counterflow with said evacuated air from said heating station in said heat exchanger, said first temperature and humidity of said fresh air being lower than said second temperature and humidity of said incoming drying air.

7. The drier defined in claim 6 further comprising a heater located between said pump means and said heat exchanger.

8. The drier defined in claim 6 wherein said heating station further comprises a burner preheating said incoming air.

9. The drier defined in claim 6 wherein said conveying means includes roller conveyors.

10. The drier defined in claim 6 wherein said first heat exchanger is provided with a plurality of tubes lying parallel to said travel direction of the boards, and
a plurality of collectors spaced apart and connecting said tubes and running transversely to said travel direction.

11. The drier defined in claim 6 wherein said conveying means includes belt conveyors.

12. The drier defined in claim 6 wherein said heat exchanger which extends in decks above said conveying means.

* * * * *